United States Patent [19]

Datta et al.

[11] Patent Number: 4,898,845
[45] Date of Patent: Feb. 6, 1990

[54] CATALYST DISPERSED IN SUPPORTED MOLTEN SALT

[75] Inventors: Ravindra Datta; Darrell P. Eyman, both of Iowa City, Iowa

[73] Assignee: University of Iowa Research Foundation, Iowa City, Iowa

[21] Appl. No.: 283,402

[22] Filed: Dec. 12, 1988

[51] Int. Cl.$^4$ .......................... B01J 23/42; B01J 23/74
[52] U.S. Cl. ........................................ 502/3; 502/337; 502/339
[58] Field of Search ................... 502/3, 259, 262, 334, 502/335, 337, 339

[56] References Cited

U.S. PATENT DOCUMENTS

| | | | |
|---|---|---|---|
| 3,812,171 | 5/1974 | Neikam et al. | 502/3 X |
| 3,855,307 | 12/1974 | Rony et al. | 260/604 HF |
| 3,979,332 | 9/1976 | Kiovsky et al. | 502/3 |
| 3,992,326 | 11/1976 | Benson, Jr. | 252/442 |
| 4,265,828 | 5/1981 | Knifton | 260/449 L |

OTHER PUBLICATIONS

Rony, Peter R; "Multiphase Catalysis: Concepts and Potential Applications"; Annals N.Y. Acad. of Sciences, pp. 239-243, date, vol. # unknown.

Mamantor, G. & Walters, S. E.; "The Fischer-Tropsch Reaction in Chloroaluminate Melts"; Proc. Electrochem. Soc. 1984, 84-3, pp. 90-96.

Parshall, Geo. W.; "Catalysis in Molten Salt Media"; J. Am. Chem. Soc. 94:25, Dec. 13, 1972 pp. 8716-8719.

*Primary Examiner*—W. J. Shine
*Attorney, Agent, or Firm*—Henderson & Sturm

[57] ABSTRACT

A new method for the use of microcrystallites of various materials as catalysts. The materials include metals, metal alloys and mixtures, and intermetallic compounds all of which are used as heterogeneous catalysts on porous supports. The method is different in that the microcrystallites are dispersed in molten salts which are to be used as a thin film coated on the internal surface of porous supports.

12 Claims, 1 Drawing Sheet

Figure 1

CATALYST DISPERSED IN SUPPORTED MOLTEN SALT

TECHNICAL FIELD

This invention relates to catalysts and catalytic processes.

BACKGROUND ART

Heterogeneous Catalysis

Heterogeneous catalysis involves materials which are dispersed as particles too large to be considered as molecular in nature. This is in contrast to homogeneous catalysts which involve the catalyst material dissolved in a liquid solvent phase. The heterogeneous catalyst particles are microcrystallites which are attached to or embedded in supports which themselves may or may not play a role in the reactions influenced by the catalyst. The reactant-catalyst interaction occurs only on the surface of the microcrystallites. Materials used as heterogeneous catalysts include metals, metal mixtures, intermetallic compounds, and a wide range of metal compounds including metal oxides, sulfides, halides, other binary metal compounds, hydroxides, and polynuclear metallates with oxides, sulfides, phosphates, and halides. The effectiveness of a heterogeneous catalyst in increasing the rate of the reaction of interest, is usually very sensitive to the method of preparation. The details of catalyst preparation are seldom revealed for commercial catalysts and the maintenance of a proprietary nature for this technology is often the major method of market protection.

Supported Liquid Phase Catalysis

In the technique of Supported Liquid-Phase Catalysis (SLPC), a homogeneous liquid catalyst solution is coated on the pore walls of a porous support so as to occupy a fraction of the pore space, much like a chromatographic packing supporting a liquid phase. The gaseous or vapor phase reactants diffuse through the residual gas pore space as well as through the liquid film and react within the thin liquid film to produce volatile products which then diffuse back out. Consequently, this technique used with homogeneous catalysts, combines the attractive features of homogeneous catalysis, such as high specificity and molecular dispersion of the catalyst, with those of heterogeneous catalysis such as large interfacial area, less corrosion, ease of separation, and use of conventional equipment like packed-bed and fluidized-bed reactors. The major limitation of SLPC is the requirement that for adequate stability the reactants and products must be in gaseous or vapor form at the reaction conditions, while the catalyst solution must be essentially non-volatile. This has so far been the major stumbling block in the industrial application of SLPC.

Related Patents and Literature References

A search of the literature has revealed a few patents in which transition metal compounds are used as homogeneous catalysts dissolved in fused salts. (Knifton, J. F., Pro. Symp. Inc. - Univ. Coop. Chem., Dept. Chem., Texas A&M, 1983, 115, Shapiro, B., Ed.) In almost every case the fused salt is used in bulk or pool form as a reaction solvent. The majority of the interest in this technology appears to be in the use of mixtures of carbon monoxide and hydrogen, called synthesis gas, as starting materials for synthesizing higher value chemicals. A patent issued to Knifton describes the use of various ruthenium compounds dispersed in low melting molten salts in the catalytic conversion of carbon monoxide and hydrogen to ethylene glycol. (Knifton, J. F., U.S. Pat. No. 4,265,828, (1981)). Although no mention is made of the solubility of these catalyst precursors in the molten salt, Knifton has reported in the literature that the process involves a homogeneous catalyst.

A second related patent, issued to Rony, describes the use of supported molten salt catalysis with homogeneously dispersed transition metal compounds. (Rony, P.R., et al., U.S. Pat. No. 3,855,307 and Rony, P.R., Belgian Pat. No. 711,042 (1968).) The claims in this patent involve hydroformylation of unsaturated hydrocarbons using an arylphosphine complex of rhodium or rhodium carbonyl bis triphenyl chloride as homogenously dispersed catalysts. Two other literature references suggest or report the use of metal catalysts dispersed in molten salts in pool form. (Mamantov, G.; Walters, S. E., Proc. Electrochem. Soc., 1984, 84-3, 90 and Parshall, G., J. Am. Chem. Soc., 1972, 88, 8718.) In neither case is the molten salt supported.

When used in pool form, any gaseous reactants must be bubbled through the molten salt mixture. This imposes severe diffusional limitations on the rate of reaction since the interfacial area for mass transfer is small and the liquid diffusion coefficients are very small. This greatly reduces the effectiveness of catalyst utilization and requires larger reactors for a given conversion. Molten salts are also extremely corrosive so that expensive materials of construction are required. The use of supported molten salts obviates these serious limitations.

DISCLOSURE OF THE INVENTION

The present invention provides a new method for the use of microcrystallites of various materials as catalysts. The materials include metals, metal alloys and mixtures, and intermetallic compounds all of which are used as heterogeneous catalysts on supports. The method is different in that the microcrystallites are dispersed in molten salts which are to be used as a thin film coated on the large internal surface area of porous supports or substrates.

The supported molten salt catalysis (SMSC) method is unique in that the entire surface of the catalyst microcrystallite is exposed to reactants only after they diffuse into the molten salt phase. By contrast, in heterogeneous catalysis, wherein microcrystallites are fixed on the surface of porous supports, only the exposed portion of the microcrystallite is available for adsorption of the reactant prior to reaction. The advantages of the use of molten salts as the host liquid phase, rather than high boiling organic liquids, include very low volatility and the large working temperature range accessible by selection of various eutectics. It is likely that crystallite size of heterogeneous catalysts dispersed in molten salts will be smaller than that observed in conventional heterogeneous catalysts. Smaller crystallite size is frequently desirable and results in increased reactivity and altered selectivity. This feature may allow substitution of precious metals by less expensive catalyst materials. In addition, the deactivation characteristics of SMSC catalysts are likely to be very different from those of conventional heterogeneous catalysts because of the presence of the molten salt phase.

Possible uses of the invention include almost any reaction of materials which usually involve heterogeneous catalysts on supports. For organic materials these include isomerization, hydrogenation, dehydrogenation, reforming, hydroisomerization, hydrocracking, cyclodehydrogenation or aromatization, hydrodesulfurization, hydrodenitrogenation, hydrodeoxygenation, hydrodealkylation, C-H bond activation, air oxidation, and a range of C chemistry including carbon monoxide reduction (Fischer-Tropsch), water-gas shift chemistry, carbon dioxide activation, and carbon dioxide scavenging, etc. In addition, hydrogenation and oxidation of liquid and gaseous inorganic materials are possible uses.

Possible molten salts which can be used include both pure inorganic and organic materials, and eutectic and non-eutectic mixtures. Such materials could have cationic or positively charged components such as alkali metals, alkaline earth metals, aluminum, gallium, indium, germanium, tin transition metals, lanthanide metals, phosphonium, ammonium, sulfinium, arsenium, and stibium ions including polyalkyl and polyaryl substituted species. The anionic or negatively charged components could include halides, oxides, sulfides, nitrates, carbonates, carboxylates, silicates, aluminates, sulfates, phosphates, arsenates, borates, alkoxides, and aryl and alkyl sulfonates.

Possible porous supports or substrates which can be used include alumina, silica, carbon, titania, magnesia, zirconia, chromia, transition metal and lanthanide metal oxides, mixed oxides, metal ion doped or coprecipitated mixtures which include these supports, and zeolites.

Possible active metals which can be used as dispersed microcrystallites include chromium, manganese, iron, cobalt, nickel, copper, molybdenum, ruthenium, rhodium, palladium, silver, tungsten, rhenium, osmium, iridium, platinum, gold, and bimetallic and polymetallic mixtures of these.

Applicants have established that the use of molten salt eutectics as the liquid phase reaction medium overcomes the solution volatility problem commonly encountered in SLPC (vide supra). Molten salts have been used as the solvent for transition metal complex catalysts in what is better termed supported molten salt catalysis (SMSC). Others have reported the use of catalysts which are homogeneously dispersed in molten salts used in bulk or pool form. In this form, diffusion limitations hinder mass transfer and corrosion problems are very severe. In contrast to these difficulties, the SMSC method does not present diffusion limitations because of the very thin films through which the reactants and products must move. In addition the corrosion problems are entirely removed because the molten salt is all contained within the support and does not contact the walls of the containment vessel.

Innumerable applications are possible with this novel technique for developing efficient catalysts for industrial use. Homogeneous dispersions of catalysts is an application in which a very large number of commercially important processes might be improved using the method of SMSC. Most homogeneous catalytic species that are in ionic form can be supported using molten salt eutectics. A large variety of such eutectics is available with melting points ranging from below 100° C. to above 1,000° C. Consequently, the technique is potentially applicable to any reaction system. As an example, the SMSC Wacker process catalyst has been developed by applicants by replacing the conventional aqueous solvent phase ($H_2O$ + HCl) with a eutectic melt and supporting on porous silica. In addition, it has high rates and selectivity, is stable, and eliminates the severe corrosion problems encountered in the conventional commercial process.

Industrial heterogeneous catalysts typically involve transition metal microcrystallites or metal compounds used as fine particles supported on porous materials (vide supra). One of the major disadvantages of using a heterogeneous catalyst in the conventional manner, relative to use as a dispersion in a molten salt, is the percentage and nature of that portion of the microcrystallite surface which is actually exposed and available for reaction. The mobility of the unattached microcrystallites inherent in the SMSC method insures this exposure. In addition, the size of microcrystallites in SMSC is expected to be smaller than that in a typical heterogeneous catalyst because of the highly polar nature of the molten salt which tends to stabilize smaller microcrystallites and discourage agglomeration.

BRIEF DESCRIPTION OF THE DRAWINGS

These and other attributes of the invention will become more clear upon a thorough study of the following description of the best mode for carrying out the invention, particularly when reviewed in conjunction with the following examples and drawings, wherein.

BEST MODE FOR CARRYING OUT THE INVENTION

The following examples are illustrative of the best mode for carrying out the invention. They are obviously not to be construed as limitative of the invention since various other embodiments can readily be evolved in view of the techings provided herein.

I.

INTRODUCTION

The following examples present the results of a set of studies designed to evaluate the potential advantages associated with the use of transition metal microcrystallites dispersed in molten salts in the dehydrogenation of cyclic hydrocarbons which are viewed as potential endothermic fuel candidates. Although both molten salt pools and Supported Molten Salt Catalysts (SMSC) were studied, only SMSC gave results which show any developmental promise.

All of the SMSC studies were performed in packed tube reactors and were designed to permit comparison with data for conventional heterogeneous catalysts used under the same operational conditions (i.e., temperature, pressure, flow rate, catalyst loading, support, etc.). The majority of the studies involved the dehydrogenation of methylcyclohexane (MCH) to toluene. This reaction system was selected because of the existing data base generated by the extensive studies using conventional heterogeneous platinum catalysts usually on alumina supports. (Nixon, A. C., *A Study on Endothermic and High Energy Fuels for Airbreathing Engines*, 1986.)

The observations considered of greatest significance in evaluating the catalyst preparations were mole percent conversion, mole percent cracking, rate of catalyst deactivation, and indications of the most probable mechanism of catalysts deactivation. The objectives did not encompass optimization of the SMSC technique in this application, but the preliminary results suggest that optimization studies are worthwhile.

II.
MOLTEN SALT POOL STUDIES

The study of bulk molten salt pools, although determined to be of little value in the observation of catalytic dehydrogenation of cycloalkanes, served as a useful source of information which was helpful in designing SMSC systems. The information collected was of value in (1) evaluating various candidate eutectics for use in SMSC; (2) selection of catalyst precursors; (3) determining the rate and extent of hydrogen reduction of homogeneously dispersed catalyst precursors; and (4) permitting identification of the species produced by reduction of the catalyst precursor.

A. EUTECTICS

Studies of molten salt pools were of value in characterizing the behavior of various molten salt eutectics under the operating conditions required for preparation of the catalyst or for observing dehydrogenation reactions at higher temperatures. The eutectic properties, observed during molten salt pool studies, included melting point, homogeneity of the catalyst precursor dispersion, vaporization tendencies, water retention, silica surface wetting, reaction with silica and/or alumina, and fluidity.

Molten salt pool studies were especially valuable in characterizing the eutectics which contained $ZnCl_2$. These eutectics were found to tenaciously retain water and to display relatively high vapor pressures as evidenced by deposition of $ZnCl_2$ at cold spots in the reaction apparatus. Since vaporization of molten $ZnCl_2$ changes the composition of the eutectic and consequently raises its melting point, all eutectics containing $ZnCl_2$ were abandoned for use in SMSC.

The eutectics which were evaluated in molten salt pool studies included the following:

| Eutectic | | m.p. °F. |
|---|---|---|
| 1. $ZnCl_2$/KCl | (71/29 mole %) | 504 |
| 2. $ZnCl_2$/KCl | (68/32 mole %) | 464 |
| 3. $ZnCl_2$/KCl | (54/46 mole %) | 442 |
| 4. $ZnCl_2$/KCl/NaCl | (60/20/20 mole %) | 397 |
| 5. KCl/LiCl | (41.5/58.5 mole %) | 682 |
| 6. KCl/NaCl/LiCl | (26/36/38 mole %) | 675 |
| 7. $MgCl_2$/NaCl/KCl | (60/20/20 mole %) | 729 |
| 8. CuCl/KCl | (65/35 mole %) | 282 |
| 9. KOH | | 680 |
| 10. KOH/NaOH | (53/47 mole %) | 356 |

Molten pools of eutectics 2, 4, 5, 9, and 10 were observed to wet the surface of a silica crucible. A molten pool of eutectic 8 did not wet silica. This property is considered to be of significance if the molten salt is to be effective in forming relatively uniform thin films on the walls of the pores of silica supports.

B. CATALYST PRECURSOR REDUCTIONS

Metallic platinum dispersions in the halide molten salt pools #5 and #6 were successfully generated using hydrogen reduction. Both $K_2PtCl_4$ and $K_2PtCl_6$ were reduced to metallic platinum in these pools. In molten salts containing $ZnCl_2$ the long term retention of water always led to very rapid hydrolysis of $PtCl_4^{-2}$ to PtO upon melting of the eutectic. The reduction of PtO to metallic platinum, which occurred very rapidly in these eutectics under a stream of hydrogen, may offer some advantages over reduction of platinum halides. Although platinum halides are more readily reduced, it has been reported that reduction of PtO produces smaller platinum particles. (Janz, G. J., The Molten Salt Handbook, Academic Press, 1967.) The use of $PtCl_6^{-2}$ in eutectics containing $ZnCl_2$ also led to hydrolysis, producing $PtO_2$, but the hydrolysis was not as rapid or as extensive as that of $PtCl_4^{-2}$. After reduction with hydrogen, significant quantities of $PtO_2$ remained. This system was found to be complicated by the fact that $K_2PtCl_6$ was not very soluble in molten $ZnCl_2$/KCl eutectics which contained significant amounts of water. These observations established the incompatibility of ZnCl/KCl eutectics with $K_2PtCl_6$ as a catalyst precursor.

In pool studies of alkali metal hydroxide melts, it was observed that $K_2PtCl_6$ reacted very rapidly to form $PtO_2$ when added to the melt. In hot aqueous solutions of the alkali hydroxides, $K_2PtCl_6$ displayed quite high solubility, apparently because of reaction with formation of a soluble hydroxide derivative. This made it possible to load supports with hot aqueous solutions of the components necessary to give alkali hydroxide melts with Pt(IV) catalyst precursor homogeneously dispersed. Pool studies of these systems indicate that the Pt(IV) can be reduced to metallic platinum by passing hydrogen gas at elevated temperatures.

Dispersions of metallic nickel in $ZnCl_2$/KCl molten eutectic pools were generated by hydrogen reduction of homogeneously dispersed nickel (II) chloride, added as the hexahydrate. The identity of the metallic product was established by chemical means. Attempts to reduce cobalt (II) chloride in a $ZnCl_2$(54 mole %)/KCl (46 mole %) eutectic were unsuccessful, but in LiCl (58.5 mole %)/KCl (41.5 mole %) hydrogen gas very slowly, but completely reduced $CoCl_2$ to metallic cobalt. Verification of the formation of metallic cobalt was established by chemical methods.

C. CATALYTIC ACTIVITY OF METAL DISPERSIONS

Dispersions of platinum generated in $ZnCl_2$ molten eutectic pools were used unsuccessfully in attempts to dehydrogenate MCH. These dispersions also displayed no catalytic activity in the hydrogenation of cyclohexene or styrene. In these experiments, gaseous reactants were introduced to the system in several ways, including bubbling through the eutectic, pressurizing the eutectic in an autoclave, and blowing a stream onto the surface of the eutectic. In no case was any catalytic activity observed. These results led to the decision to abandon molten salt pool studies and to pursue only studies of supported catalysts. As was learned later, dispersions of metallic platinum in eutectics containing $ZnCl_2$ did not show significant catalytic activity even when used in SMSC. Because of the successful observation of catalytic dehydrogenation activity by platinum used in SMSC, molten eutectic pool studies were abandoned as a preliminary test for catalytic activity.

III.
SMSC STUDIES

All SMSC studies were done using the following general procedure;
1. loading the catalyst precursor and molten salt components on supports;
2. loading the supports into the reactor tube;
3. conversion of the catalyst precursor to catalyst;

4. thermostating the reactor tube to the desired reaction temperature;
5. thermostating the inlet and outlet tubes to the desired temperature;
6. heating the reactant reservoir to generate a vapor pressure;
7. starting the flow of helium sweep gas over or through the reservoir;
8. GC sampling and bulk collection of product gases;
9. mass spectral identification of collected product;
10. $^1$H NMR identification of products not identified by mass spectroscopy.

The final results of SMSC experiments were in every case compared to the results of an experiment using a conventional heterogeneous catalyst with the same support, and the same amount of catalyst used under the same operating conditions. In these experiments the conventional catalyst was prepared in same manner as the SMSC catalyst without inclusion of the components of the molten salt eutectic.

A. CATALYST PREPARATION TECHNIQUES

Supported molten salt catalysts were prepared after addition of solutions of the components of the molten salt eutectic and the catalyst precursor to silica and/or alumina carriers. Hydrogen reduction was used to convert the catalyst precursor to the active form of the catalyst preparation. The solvent in which all components of the molten salt eutectic and the catalyst precursor were necessarily homogeneously dispersed, was either water or methanol. With the alkali hydroxide eutectics the components of the molten salt eutectic and the catalyst precursor were often loaded in separate sequential steps to avoid difficulties encountered because of extensive reaction of the catalyst precursor with alkali to give precipitates. In each loading step the solvent was removed by heating the carrier to 250° F. while applying a vacuum.

In Supported Liquid Phase Catalysis the liquid loading, q, is defined as:

$$q(\text{Loading}) = \frac{\text{Volume of catalyst solution occupying internal pores of carrier}}{\text{total pore volume}}$$

Thus, liquid loading can be varied from 0, which corresponds to conventional heterogeneous catalyst, to 1 where the internal pores are completely filled with the molten salt catalyst mixture.

The tabulations found in Table 1 gives the calculated values for molten salt liquid film thickness, and void space diameter as a function of liquid loading, q, for the two supports used in the reported SMSC studies.

It is generally observed, and predicted by theory, that at very low levels of loading, the reaction rate or catalyst activity increases as q increases. As q increases further, diffusional resistances also increase, resulting in decreases in rates of reaction or catalyst activity. Furthermore, theory predicts that there is an optimum loading level.

TABLE 1

Molten Salt Film Thickness Variation With Liquid Loading

| q | Void Diameter (A) | Film Thickness (A) |
|---|---|---|
| SiO$_2$, United Catalysts, Inc., T-1571, average pore diameter = 180(A) | | |
| 0.10 | 170 | 5 |
| 0.20 | 160 | 10 |
| 0.30 | 150 | 15 |
| 0.40 | 140 | 20 |
| 0.50 | 128 | 26 |
| 0.60 | 114 | 33 |
| 0.70 | 100 | 40 |
| 0.80 | 80 | 50 |
| 0.90 | 56 | 62 |
| Al$_2$O$_3$, United Catalysts Inc., T-2432, average pore diameter = 350 (A) | | |
| 0.10 | 332 | 9 |
| 0.20 | 314 | 18 |
| 0.30 | 293 | 29 |
| 0.40 | 271 | 39 |
| 0.50 | 247 | 51 |
| 0.60 | 221 | 64 |
| 0.70 | 192 | 79 |
| 0.80 | 156 | 97 |
| 0.90 | 111 | 120 |

Two different catalyst loading techniques were employed. These were the adsorption from solution, or saturation method, and the impregnation method. In both methods, the support pellets were held under vacuum for several hours before addition of the water or methanol solution carrying the components of the molten salt eutectic and the catalyst precursor. In the saturation method whole support pellets were totally immersed into excess solution which was gently stirred with heating for 1 hour. The pores of the pellets are assumed to be totally filled with solution by strong capillary action. Excess solution was decanted from the pellets.

In the impregnation method a quantity of solution, exactly equal to the total pore volume of the pellets, was added to the pellets. It is claimed that in the saturation method, the concentration of the platinum remaining in solution changes as adsorption proceeds.

In both methods the solvent water or methanol was removed by heating the pellets to 250° F. under vacuum overnight after which the pellets are ready for charging the reactor.

After the support was loaded with the desired molten salt eutectic and catalyst precursor components, it was packed into the tube reactor and reduced by passing a stream of hydrogen. Several procedures were used in the catalyst precursor reduction step. These ranged from passing hydrogen gas at 700° F. and 1 atm for 12 hours with no period of calcining prior to reduction to an opposite extreme of calcining at 840° F. for 24 hours followed by hydrogen reduction at 100 psi over a 24 hour period during which the temperature was ramped from 250° F. to 840° F. There is little doubt, as the data will show, that the dehydrogenation conversions of MCH to toluene displayed a sensitivity to the extent of catalyst precursor reduction. As will be seen (vide infra), the results do indicate that in almost all cases complete reduction of the catalyst precursor was not attained by passing hydrogen.

B. APPARATUS

Figure 1:
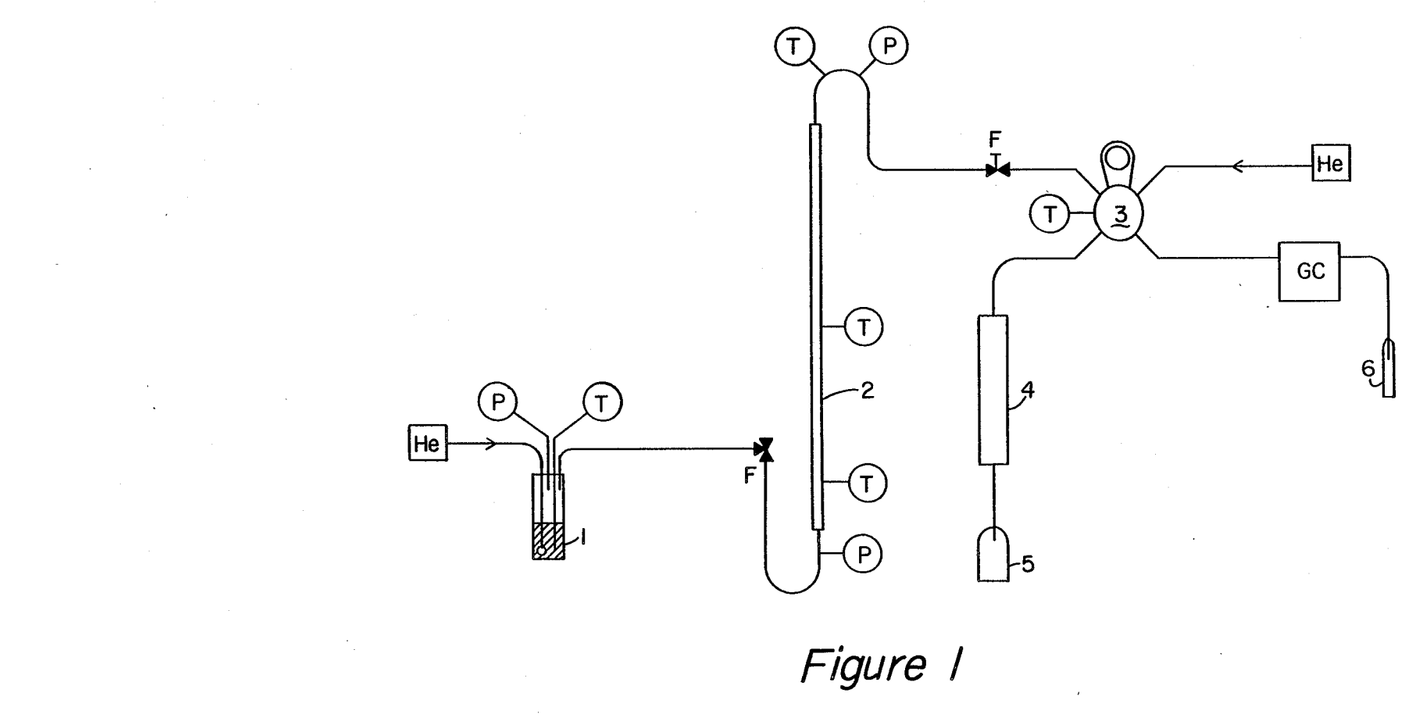
FIG. 1 is a schematic drawing illustrating the apparatuses used to carry out the process of the present invention.

Two separate apparatuses were used to characterize the activities of SMSC dehydrogenation catalysts. A general schematic diagram of these apparatuses is shown in FIG. 1. The only significant difference in the two apparatuses is in the length of the tube reactor, the nature of the reservoir, and in the region used for preheating of the gaseous hydrocarbons prior to entering the catalyst bed.

In one apparatus the reservoir is a 2.0 liter autoclave which is thermostatically heated with a heating jacket and fitted with a sparge tube, immersed in the liquid hydrocarbon, for introduction of the helium sweep gas. This apparatus has a ½ inch inside diameter stainless steel tube, 24 inches long, which is heated by a heating tape. The preheating region, 6 inches in length, is packed with silica chips, and the supported catalyst is contained in a 12 inch length.

In the second apparatus the reservoir is a 800 ml gas storage tank which is thermostatically heated with heating tape. This tank is fitted with a tube which extends into the tank from the helium sweep tube at the top end of the tank. The ¼ inch inside diameter stainless steel tube reactor, 8 inches long, is preceded in the flow stream by a ⅛ inch stainless steel tube which is coiled around the body of the tube reactor. The tube reactor and the preheater region are both heated by the same heating tape.

In each apparatus the ⅛ inch stainless steel tubes exiting the reactor pass through a heated gas sampling valve which is connected to the in-line gas chromatograph. These lines are heated with heating tape to minimize condensation of reaction products prior to analysis. With higher boiling products these tubes are often heated to greater than 350° F.

In a typical experiment, the reservoir temperature and the helium sweep gas pressure and flow rate are elevated only after the tube reactor is brought up to the desired temperature. In one of the apparatuses, the helium and hydrocarbon stream can be shunted around the reactor so that desired flow and pressure conditions can be reached before any reactant comes into contact with the catalyst. The total pressure of helium and hydrocarbon used has been varied from 35 to 85 psi in order to adjust hydrocarbon flow rates. Product composition, determined by gas chromatography, is recorded with reference to the time of introduction of the first sample of hydrocarbon to the reactor.

C. METHYLCYCLOHEXANE DEHYDROGENATION

In the efforts reported here, the dehydrogenation of MCH has been studied more extensively than any other hydrocarbon because of the desire to evaluate SMSC catalysts. The established data bank for catalytic dehydrogenation of MCH using heterogeneous catalysts, primarily platinum on alumina has been used as a primary point of reference. In our studies two supports, silica and alumina, have been used to evaluate aspects of support composition on the catalyst efficiency and on potential side reactions. These studies have not involved a systematic variation in the pore size and surface area.

In the following experiments, the data from each dehydrogenation giving significant results will be presented with all of the operational and systematic variables indicated. Any special experimental design or unusual observations will be presented with the results of the experiment.

1. PLATINUM CATALYSTS

Platinum catalysts were used on both silica and alumina supports. In all cases the catalysts were generated by hydrogen reduction of $PtCl_6^{-2}$ loaded as the potassium or sodium salt using water or methanol.

a. SILICA SUPPORT

The silica support or substrate was United Catalysts Inc., #T-1571, used as 4–5 mm diameter spheres. The following characteristics are reported by the manufacturer in product bulletin CC-0381.

Major components: 93% $SiO_2$, 3% $Al_2O_3$, and 1% $Fe_2O_3$.
Surface area: 131 m$^2$/g
Total pore volume: 0.71 cc/g
Average pore diameter: 180 A
Approximate bulk density: 39 lbs/CF
Crush strength: 8 lbs.

Experiment 1. MCH
Pt/SiO$_2$ ("conventional" heterogeneous catalyst)

Catalyst: Pt, 1%
Supported Molten Salt: Loading (q): 0.00
MCH/He Flow Rate: 30 cc/min
Reservoir Temperature: 218° F. (103° C.)
Reservoir Pressure (He + MCH): 105 psi
Drying: 2 hours, 302° F. Reduction: H$_2$ gas, 1 atm, 14 hours, 752° F.

| Elapsed Time (min) | Reactor Temp. (°F.) | Reactor Press. (psi) | Cracked | MCH | TOLUENE |
|---|---|---|---|---|---|
| 1 | 883 | 95 | 3.1% | 0% | 96.9% |
| 51 | 853 | 95 | 2.8 | 1.0 | 96.2 |
| 121 | 860 | 95 | 3.2 | 3.4 | 93.4 |
| 177 | 874 | 95 | 3.5 | 0 | 96.5 |
| 360 | 878 | 98 | 3.7 | 0 | 96.3 |
| 600 | 957 | 100 | 3.2 | 22.4 | 74.5 |
| 699 | 945 | 100 | 2.4 | 28.2 | 69.4 |
| 775 | 934 | 102 | 2.5 | 31.2 | 66.3 |
| 900 | 941 | 100 | 2.6 | 31.0 | 66.4 |

The results of this experiment, and subsequent repetitions, served as the basis for comparison of conventional Pt/SiO$_2$ catalysts with SMSC catalysts.

Experiment 2. MCH - Pt—KCl—LiCl/SiO$_2$

Catalyst: Pt, 1%
Supported Molten Salt: KCl(41.5 mole %)/LiCl(58.5 mole %)
Loading (q): 0.30
MCH/He Flow Rate: 30 cc/min.
Reservoir Temperature: 218° F. (103° C.)
Reservoir Pressure (He + MCH): 95 psi
Drying: 2 hours, 302° F. Reduction: H$_2$ gas, 1 atm, 14 hours, 752° F.

| Elapsed Time (min) | Reactor Temp. (°F.) | Reactor Press. (psi) | Cracked | MCH | TOLUENE |
|---|---|---|---|---|---|
| 1 | 815 | 85 | 93.6 | 6.4 | — |
| 766 | 828 | 85 | 1.5 | 93.0 | 5.5 |
| 803 | 1044 | 85 | 5.6 | 81.0 | 13.4 |
| 819 | 1108 | 85 | 0.3 | 72.3 | 17.4 |
| 833 | 1155 | 85 | 30.7 | 37.2 | 30.2 |
| 841 | 1164 | 85 | 31.9 | 33.7 | 32.7 |
| 886 | 1159 | 85 | 21.3 | 37.4 | 39.4 |
| 923 | 1162 | 85 | 28.4 | 28.9 | 41.0 |

In this experiment, very low conversion of MCH to toluene was obtained at temperatures below 825° F. This suggests that the melting point of the eutectic, when in the support pores, is above this temperature. This may actually be due to the fact that little reduction was accomplished during the passing of hydrogen which would lead to a salt mixture which is 21.8 mole % Na$_2$PtCl$_6$. This salt mixture would probably have a lower melting point if the platinum was reduced. This proposal is consistent with the relatively low initial activity observed at temperatures above 825° F. The increasing activity with time at the higher temperatures is probably due to increased reduction of $PtCl_6^{-2}$ as hydrogen is released by the dehydrogenation.

Experiment 3. MCH - Pt—KCl—LiCl/SiO$_2$

Catalyst: Pt, 1.7%
Supported Molten Salt: KCl(41.5 mole %)/LiCl(58.5 mole %)
Loading (q): 0.50
MCH/He Flow Rate: 30 cc/min
Reservoir Temerature: 216° F. (102° C.)
Reservoir Pressure (He + MCH): 95 psi
Drying: 2 hours, 302° F. Reduction: H$_2$ gas, 1 atm, 14 hours, 752° F.

| Elapsed Time (min) | Reactor Temp. (°F.) | Reactor Press. (psi) | Cracked | MCH | TOLUENE |
|---|---|---|---|---|---|
| 1 | 842 | 85 | 5.0 | 94.7 | — |
| 13 | 878 | 85 | 1.0 | 98.9 | 0.1 |
| 579 | 1044 | 85 | 2.0 | 97.4 | 0.5 |
| 756 | 1112 | 85 | 11.0 | 80.6 | 7.7 |
| 780 | 1184 | 85 | 36.0 | 25.5 | 37.7 |
| 829 | 1189 | 85 | 45.9 | 13.2 | 40.5 |

In this experiment as in Experiment 2, the period of reduction apparently was done at temperatures below the melting point of the eutectic components or at inadequate pressures. The initial low activity of the catalyst indicates that very little active catalyst is present. The gradual increase in activity is apparently due to increasing quantities of active platinum catalyst as the reaction proceeds.

Experiment 4. MCH - Pt—NaOH—KOH/SiO$_2$

Catalyst: Pt, 1%
Supported Molten Salt: NaOH/KOH (47/53 mole %)
Loading (q): 0.15
MCH/He Flow Rate: 30 cc/min
Reservoir Temperature: 219° F. (104° C.)
Reservoir Pressure (He + MCH): 100 psi
Drying 2 hours, 302° F. Reduction: H$_2$ gas, 1 atm, 14 hours, 707° F.

| Elapsed Time (min) | Reactor Temp. (°F.) | Reactor Press. (psi) | Cracked | MCH | TOLUENE |
|---|---|---|---|---|---|
| 1 | 833 | 90 | 4.2 | — | 95.8 |
| 60 | 831 | 90 | 3.7 | — | 96.3 |
| 120 | 831 | 90 | 4.2 | — | 95.8 |
| 240 | 929 | 91 | 4.3 | — | 95.6 |
| 360 | 833 | 90 | 3.2 | 10.0 | 85.0 |
| 480 | 833 | 90 | 4.5 | 8.0 | 87.3 |
| 600 | 835 | 95 | 10.0 | 10.2 | 79.8 |
| 720 | 856 | 95 | 3.9 | 21.5 | 74.6 |
| 840 | 856 | 92 | 4.6 | 15.4 | 80.0 |
| 960 | 856 | 92 | 6.2 | 13.6 | 80.1 |

The initially observed conversion of MCH to toluene indicates that the catalyst precursor reduction has been effective. The increased effectiveness is probably attributable to the fact that the NaOH/KOH eutectic has a relatively low melting point, 356°, which was exceeded by 350° F. during the reduction step. This experiment demonstrates the decreased rate of deactivation of platinum when used in SMSC mode. Although the cracking is almost doubled that observed in the conventional catalyst, it is still only about 5%.

Experiment 5. MCH - Pt—NaOH—KOH/SiO$_2$

Catalyst: Pt, 1%
Supported Molten Salt: NaOH/KOH (47/53 mole %)
Loading (q): 0.30
MCH/He Flow Rate: 30 cc/min
Reservoir Temperature: 218° F. (103° C.)
Reservoir Pressure (He + MCH): 105 psi
Drying: 2 hours, 302° F. Reduction: H$_2$ gas, 1 atm, 14 hours, 752° F.

| Elapsed Time (min) | Reactor Temp. (°F.) | Reactor Press. (psi) | Cracked | MCH | TOLUENE |
|---|---|---|---|---|---|
| 1 | 876 | 100 | 1.8 | 14.6 | 83.6 |
| 11 | 876 | 100 | 2.5 | 5.8 | 90.1 |
| 58 | 878 | 100 | 17.5 | 11.3 | 71.2 |
| 85 | 882 | 100 | 12.5 | 3.7 | 83.8 |
| 123 | 887 | 100 | 9.3 | 15.3 | 75.3 |
| 185 | 878 | 100 | 5.0 | 22.5 | 72.5 |
| 352 | 878 | 100 | 29.0 | 9.7 | 57.5 |
| 485 | 883 | 100 | 11.0 | 45.2 | 43.6 |
| 527 | 883 | 100 | 12.8 | 57.5 | 30.0 |

The results of this experiment suggest that a given quantity of catalyst, when dispersed in a larger volume of molten salt, displays a lower activity. This effect may have its origin in diffusional retardation since the molten salt liquid layer is thicker at higher liquid loading. This same effect could decrease the efficiency of hydrogen reduction of the catalyst at higher liquid loading. This would explain why the initial activity is lower at liquid loading of 0.30 than at 0.15. The average thicknesses of molten salt films have been calculated for the pore sizes. (See Table 1).

Experiment 6. MCH - Pt—NaOH—KOH/SiO$_2$

Catalyst: Pt, 3.3%
Supported Molten Salt: NaOH/KOH (47/53 mole %)
Loading (q): 0.50
MCH/He Flow Rate: 30 cc/min
Reservoir Temperature: 218° F. (103 ° C.)
Reservoir Pressure (He + MCH): 105 psi
Drying: 2 hours, 302° F. Reduction: H$_2$ gas, 1 atm, 16 hours, 770° F.

| Elapsed Time (min) | Reactor Temp. (°F.) | Reactor Press. (psi) | Cracked | MCH | TOLUENE |
|---|---|---|---|---|---|
| 1 | 860 | 94 | 67.3 | — | 32.0 |
| 27 | 860 | 90 | 41.4 | — | 57.0 |
| 63 | 860 | 90 | 20.8 | — | 78.0 |
| 97 | 860 | 93 | 16.3 | 1.0 | 76.3 |
| 134 | 860 | 93 | 21.9 | 1.5 | 69.7 |
| 191 | 867 | 91 | 8.6 | 2.4 | 92.1 |
| 281 | 865 | 90 | 9.1 | 4.5 | 91.3 |
| 358 | 865 | 92 | 2.6 | 3.3 | 94.0 |
| 540 | 865 | 92 | 13.7 | 2.6 | 83.6 |
| 600 | 869 | 95 | 3.0 | 14.9 | 82.1 |
| 650 | 865 | 90 | 2.6 | 15.5 | 80.7 |
| 695 | 865 | 90 | 2.5 | 12.9 | 82.5 |

The observations in this experiment are not inconsistent with the discussion found after Experiment 5. The relatively low activity observed in the initial conversion may be due to the less efficient or slower hydrogen reduction process accompanying the higher liquid loading. The higher platinum loading makes it possible for the catalyst to eventually attain an activity near that displayed in Experiment 4.

For Experiments 1 through 6 reported before, the total amount of catalyst preparation placed in the tube reactor was approximately 7 g. Experiments 7 through 11 were performed to study the effects of varying catalyst precursor reduction period, reactor temperature, and MCH feed composition on the catalyst performance. In these experiments, the catalytic behavior of 1 g portions of a large catalyst preparation were examined while systematically altering these operational variables. The catalyst was used as a plug in the center 1 inch of the reactor tube with approximately 3 inches of $SiO_2$ support both before and after (i.e., upstream and downstream) the plug.

Experiment 7. MCH - Pt—NaOH—KOH/$SiO_2$
Catalyst: Pt, 1.0%
Supported Molten Salt: NaOH/KOH (47/53 mole %)
Loading (g): 0.30
MCH/He Flow Rate: 30 cc/min
Reservoir Temperature: 217.5° F. (103° C.)
Reservoir Pressure (He + MCH): 100 psi
Drying: 2 hours, 302° F. Reduction: $H_2$ gas, 1 atm, 14 hours, 698° F.

| Elapsed Time (min) | Reactor Temp. (°F.) | Reactor Press (psi) | Cracked | MCH | TOLUENE |
|---|---|---|---|---|---|
| 1 | 799 | 85 | 12.5 | 22.0 | 65.5 |
| 11 | 802 | 85 | 2.0 | 18.6 | 79.4 |
| 22 | 804 | 85 | 1.9 | 27.5 | 70.6 |
| 95 | 806 | 85 | 0.5 | 94.6 | 4.9 |

Experiment 8. MCH - Pt—NaOH—KOH/$SiO_2$
Catalyst: Pt, 1.0%
Supported Molten Salt: NaOH/KOH (47/53 mole %)
Loading (q): 0.30
MCH/He Flow Rate: 30 cc/min
Reservoir Temperature: 217.5° F. (103° C.)
Reservoir Pressure (He + MCH): 100 psi
Drying: 2 hours, 302° F. Reduction: $H_2$ gas, 1 atm, 28 hours, 698° F.

| Elapsed Time (min) | Reactor Temp. (°F.) | Reactor Press. (psi) | Cracked | MCH | TOLUENE |
|---|---|---|---|---|---|
| 1 | 817 | 85 | 6.6 | 4.6 | 88.7 |
| 10 | 817 | 85 | 6.6 | 6.5 | 87.0 |
| 23 | 813 | 85 | 6.6 | 10.2 | 83.2 |
| 53 | 815 | 85 | 5.5 | 22.6 | 71.9 |
| 78 | 813 | 85 | 4.1 | 38.7 | 57.1 |
| 114 | 819 | 85 | 2.6 | 71.8 | 25.7 |
| 161 | 831 | 85 | 0.7 | 96.7 | 2.6 |

The results of Experiments 7 and 8 indicate clearly that the length of catalyst precursor reduction has a very significant impact, not only on the initial catalyst activity, but also on the observed rate of catalyst deactivation. In both cases, the black color of the deactivated catalyst, which is light grey before MCH is passed, suggests that the mechanism of deactivation is by coking. The results of Experiments 7 and 8 further suggest that the rate of coking is retarded by increased extent of catalyst precursor reduction.

Experiment 9. MCH - Pt—NaOH—KOH/$SiO_2$
Catalyst: Pt, 1.0%
Supported Molten Salt: NaOH/KOH (47/53 mole %)
Loading (q): 0.30
MCH/He Flow Rate: 30 cc/min
Reservoir Temperature: 127° F. (53° C.)
Reservoir Pressure (He + MCH): 100 psi
Drying: 2 hours, 302° F. Reduction: $H_2$ gas, 1 atm, 14 hours, 698° F.

| Elapsed Time (min) | Reactor Temp. (°F.) | Reactor Press. (psi) | Cracked | MCH | TOLUENE |
|---|---|---|---|---|---|
| 1 | 819 | 85 | 4.8 | 28.6 | 67.7 |
| 13 | 822 | 85 | 3.2 | 35.0 | 61.8 |
| 25 | 826 | 85 | 3.2 | 45.3 | 51.4 |
| 48 | 828 | 85 | 2.3 | 67.0 | 28.7 |
| 64 | 828 | 85 | 1.1 | 85.0 | 13.8 |

-continued

Experiment 9. MCH - Pt—NaOH—KOH/$SiO_2$
Catalyst: Pt, 1.0%
Supported Molten Salt: NaOH/KOH (47/53 mole %)
Loading (q): 0.30
MCH/He Flow Rate: 30 cc/min
Reservoir Temperature: 127° F. (53° C.)
Reservoir Pressure (He + MCH): 100 psi
Drying: 2 hours, 302° F. Reduction: $H_2$ gas, 1 atm, 14 hours, 698° F.

| Elapsed Time (min) | Reactor Temp. (°F.) | Reactor Press. (psi) | Cracked | MCH | TOLUENE |
|---|---|---|---|---|---|
| 85 | 826 | 85 | 0.7 | 94.7 | 4.5 |

This experiment involves significantly lower MCH flow rates since the partial pressure of MCH is significantly lower in the feed gas. The results suggest that decreased flow rate does not significantly influence the MCH to toluene conversion nor the rate of catalyst deactivation. The spent catalyst was observed to be black as in Experiments 7 and 8.

Experiment 10. MCH - Pt—NaOH—KOH/$SiO_2$
Catalyst: Pt, 1.0%
Supported Molten Salt: NaOH/KOH (47/53 mole %)
Loading (q): 0.30
MCH/He Flow Rate: 30 cc/min
Reservoir Temperature: 217° F. (103° C.)
Reservoir Pressure (He + MCH): 100 psi
Drying: 2 hours, 302° F. Reduction: $H_2$ gas, 1 atm, 28 hours, 698° F.

| Elapsed Time (min) | Reactor Temp. (°F.) | Reactor Press. (psi) | Cracked | MCH | TOLUENE |
|---|---|---|---|---|---|
| 1 | 705 | 85 | 3.0 | 7.7 | 89.4 |
| 8 | 705 | 85 | 2.3 | 10.7 | 86.9 |
| 31 | 705 | 85 | 1.8 | 14.0 | 84.1 |
| 53 | 705 | 85 | 1.7 | 17.0 | 81.4 |
| 66 | 707 | 85 | 1.6 | 19.3 | 79.1 |
| 106 | 705 | 85 | 1.4 | 21.3 | 77.3 |
| 167 | 707 | 85 | 1.4 | 25.7 | 72.9 |
| 285 | 707 | 85 | 1.5 | 30.6 | 67.9 |

These results, especially when compared to the results of Experiment 8, indicate that the MCH conversion to toluene is very high at this lower temperature for the adequately reduced catalyst. The significant decrease in the rate of deactivation and the very low occurrence of cracked products are both consistent with the anticipated decreased rate of coking at lower temperatures.

Experiment 11. MCH - Pt—NaOH—KOH/$SiO_2$
Catalyst: Pt, 1.0%
Supported Molten Salt: NaOH/KOH (47/53 mole %)
Loading (q): 0.30
MCH/He Flow Rate: 30 cc/min
Reservoir Temperature: 217° F. (103° C.)
Reservoir Pressure (He + MCH): 100 psi
Drying: 2 hours, 302° F. Reduction: $H_2$ gas, 1 atm, 28 hours, 698° F.

| Elapsed Time (min) | Reactor Temp. (°F.) | Reactor Press. (psi) | Cracked | MCH | TOLUENE |
|---|---|---|---|---|---|
| 1 | 457 | 85 | 16.0 | 78.6 | 5.4 |
| 11 | 455 | 85 | 0.5 | 93.8 | 5.7 |

The data are sparse simply because no significant conversion of MCH to toluene was detected in subsequent samplings. This is probably due to the fact that the molten salt components were either not molten at this low temperature or the high viscosity expected at temperatures just above the melting point led to very high diffusional retardation of catalytic dehydrogenation. Since the catalyst used in this experiment is the same as that used in Experiment 10 there is little doubt that the initial activity should be quite high if MCH reaches and permeates the salt film.

b. ALUMINA SUPPORT

The alumina support or substrate used was United Catalysts Inc., #T-2432. The following characteristics are reported by the manufacturer in product bulletin CC-0381.

| | |
|---|---|
| Major components: | 99.0% $Al_2O_3$ |
| Surface area: | 85 $m^2/g$ |
| Total pore volume: | 0.70 cc/g |
| Average pore diameter: | 350A |
| Approximate bulk density: | 40 lbs/CF |
| Crush strength: | 17 lbs. |
| Form: | extrudate, 3/16 inch D |

Experiment 12. MCH
$Pt/Al_2O_3$ ("conventional" heterogeneous catalyst)

Catalyst: Pt, 1%
Supported Molten Salt: Loading (q): 0.00
MCH/He Flow Rate: 30 cc/min
Reservoir Temperature: 131° F. (55° C.)
Reservoir Pressure (He + MCH): 60 psi
Drying: 2 hours, 302° F. Reduction: $H_2$ gas, 100 psi, 14.5 hours, 779° F.

| Elapsed Time (min) | Reactor Temp. (°F.) | Reactor Press. (psi) | Cracked | MCH | TOLUENE |
|---|---|---|---|---|---|
| 17 | 946 | 60 | 17.4 | 1.4 | 81.2 |
| 47 | 961 | 60 | 19.4 | 0.6 | 80.0 |
| 77 | 961 | 60 | 24.5 | 20.8 | 54.7 |
| 107 | 965 | 60 | 32.2 | 17.2 | 50.6 |
| 137 | 967 | 60 | 38.8 | 20.4 | 40.8 |
| 192 | 959 | 60 | 41.7 | 11.1 | 48.2 |
| 262 | 967 | 60 | 34.9 | 8.3 | 56.9 |
| 367 | 963 | 60 | 37.5 | 5.0 | 57.5 |
| 460 | 961 | 60 | 29.0 | 5.3 | 65.7 |
| 730 | 963 | 60 | 41.6 | 6.5 | 51.7 |
| 1550 | 959 | 60 | 36.2 | 0.0 | 63.8 |

The results of this experiment, and subsequent repetitions, served as the basis for comparison of conventional $Pt/Al_2O_3$ catalysts with SMSC catalysts.

Experiment 13. MCH - $Pt—NaOH—KOH/Al_2O_3$

Catalyst: Pt, 1.0%
Supported Molten Salt: NaOH/KOH (47/53 mole %)
Loading (q): 0.30
MCH/He Flow Rate: variable
Reservoir Temperature: variable
Reservoir Pressure (He + MCH): variable
Drying: 2 hours, 160° F. Reduction: $H_2$ gas, 100 psi 12 hours, 788° F.

| Elapsed Time (min) | Reactor Temp. (°F.) | Reactor Press. (psi) | Reservoir Temp. (°F.) | Flow cc/min | Cracked | MCH | TOLUENE |
|---|---|---|---|---|---|---|---|
| 10 | 952 | 60 | 115 | 47 | 69.8 | 20.1 | 10.1 |
| 20 | 914 | 60 | 117 | 70 | 33.4 | 52.9 | 13.7 |
| 40 | 892 | 60 | 115 | 70 | 17.2 | 68.7 | 14.1 |
| 50 | 874 | 80 | 118 | 23 | 22.6 | 67.9 | 9.5 |
| 70 | 860 | 73 | 118 | 30 | 22.9 | 56.3 | 20.8 |
| 120 | 862 | 73 | 118 | 26 | 25.8 | 51.7 | 22.5 |
| 180 | 862 | 73 | 115 | 26 | 26.2 | 47.6 | 26.2 |
| 240 | 860 | 73 | 109 | 26 | 27.4 | 42.5 | 30.1 |
| 300 | 853 | 65 | 126 | 26 | 26.4 | 41.5 | 32.1 |
| 360 | 862 | 61 | 127 | 26 | 31.7 | 30.9 | 37.4 |
| 470 | 864 | 57 | 136 | 30 | 27.3 | 36.4 | 36.4 |
| 600 | 860 | 57 | 122 | 30 | 25.5 | 29.0 | 45.5 |
| 1140 | 851 | 57 | 117 | 30 | 24.4 | 22.2 | 53.4 |
| 1200 | 905 | 57 | 118 | 30 | 27.0 | 5.4 | 67.6 |
| 1380 | 932 | 57 | 151 | 23 | 58.6 | 0.0 | 41.4 |
| 1440 | 928 | 57 | 153 | 46 | 44.7 | 12.9 | 42.4 |
| 2160 | 855 | 60 | 113 | 30 | 25.3 | 8.9 | 65.8 |
| 2640 | 849 | 62 | 118 | 30 | 29.0 | 9.0 | 71.0 |
| 3060 | 900 | 60 | 122 | 30 | 20.0 | 5.0 | 75.0 |

Although the experimental design in Experiment 13 seems to be characterized by randomness more so than order, the data are included to emphasize the general observation that catalyst activity can display significant increases during the experiment. Apparently the hydrogen reduction conditions used in the preparation of this catalyst did not permit sufficient reduction to give high initial activity. This is surprising in view of the fact that the conditions are more rigorous than those used in Experiments 7 and 9 in which initial MCH to toluene conversions exceeded 65%. These observations suggest that the support plays some role in determining the efficiency of the reduction process when a molten salt is present. It is possible that the alkali metal hydroxide eutectic dissolves enough $Al_2O_3$ to produce a eutectic which retards hydrogen reduction of the catalyst precursor at a temperature used in the reduction.

Experiment 14. MCH - Pt—NaOH—KOH/Al$_2$O$_3$

Catalyst: Pt, 1.0%
Supported Molten Salt: NaOH/KOH (47/53 mole %)
Loading (q): 0.30
MCH/He Flow Rate: 46 cc/min
Reservoir Temperature: 118° F. (48° C.)
Reservoir Pressure (He + MCH): 60 psi
Drying: 40 hours, 284° F. Reduction: H$_2$ gas, 85 psi, 12 hours, hours, ramped 248–842° F.

| Elapsed Time (min) | Reactor Temp. (°F.) | Reactor Press. (psi) | Cracked | MCH | TOLUENE |
|---|---|---|---|---|---|
| 30 | 846 | 60 | 29.2 | 0.0 | 70.8 |
| 60 | 844 | 60 | 9.6 | 0.4 | 90.0 |
| 90 | 842 | 60 | 10.0 | 1.0 | 89.0 |
| 120 | 844 | 60 | 10.0 | 3.0 | 87.8 |
| 210 | 838 | 60 | 8.6 | 10.1 | 81.3 |
| 240 | 852 | 60 | 8.1 | 4.9 | 87.0 |
| 300 | 887 | 60 | 14.0 | 2.0 | 84.0 |
| 330 | 844 | 60 | 6.0 | 17.4 | 76.6 |
| 360 | 860 | 60 | 8.7 | 14.3 | 77.0 |
| 420 | 854 | 60 | 9.0 | 19.0 | 72.0 |
| 480 | 905 | 60 | 15.0 | 5.0 | 80.0 |
| 540 | 836 | 60 | 4.6 | 31.8 | 63.6 |
| 750 | 867 | 60 | 8.2 | 28.5 | 63.3 |
| 1440 | 894 | 60 | 0.4 | 76.0 | 23.6 |

The catalyst used in this experiment was loaded sequentially. After addition of Na$_2$PtCl$_6$ using methanol as a solvent, the support was dried overnight under vacuum at 104° F. The components of the molten salt were then added using water as a solvent. The support was then dried under vacuum at 140° F. prior to the final drying at 284° F.

This catalyst displays a significantly greater activity than the "conventional" catalyst through 12.5 hours, but lower activity after 24 hours. One of the possible contributions to the loss of activity, when alkali hydroxides are used as the eutectic, is the dissolution of Al$_2$O$_3$ or SiO$_2$ in the eutectic. This would lead to an increasing melting point, which would eventually give diffussional retardation as the viscosity increased or no reaction if the molten layer solidified.

The used catalysts in Experiments 13 and 14 displayed less extensive coking than the "conventional" catalyst used in Experiment 12.

Experiment 15. MCH - Pt—KCl—NaCl LiCl/Al$_2$O$_3$

Catalyst: Pt, 1.0%
Supported Molten Salt: KCl/NaCl/LiCl (26/36/38 mole %)
Loading (q): 0.30
MCH/He Flow Rate: 48 cc/min
Reservoir Temperature: 212° F. (100° C.)
Reservoir Pressure (He + MCH): 85 psi
Drying: 10 hours, 302° F. Reduction: H$_2$ gas, 100 psi, 18 hours, ramped 662–842° F.

| Elapsed Time (min) | Reactor Temp. (°F.) | Reactor Press. (psi) | Cracked | MCH | TOLUENE |
|---|---|---|---|---|---|
| 40 | 846 | 85 | 79.1 | 0.77 | 20.2 |
| 60 | 846 | 85 | 69.9 | 2.1 | 28.8 |
| 90 | 844 | 85 | 62.6 | 2.0 | 35.4 |
| 120 | 844 | 85 | 58.6 | 1.50 | 39.9 |
| 150 | 847 | 85 | 51.5 | 0.53 | 48.0 |
| 180 | 847 | 85 | 41.4 | 0.0 | 58.6 |
| 240 | 847 | 85 | 32.0 | 0.0 | 68.0 |
| 300 | 847 | 85 | 34.8 | 0.0 | 66.0 |
| 360 | 849 | 85 | 34.9 | 0.0 | 65.1 |
| 420 | 849 | 85 | 32.2 | 0.0 | 67.8 |
| 480 | 853 | 85 | 32.1 | 0.0 | 67.9 |
| 540 | 844 | 85 | 33.3 | 0.0 | 66.7 |
| 600 | 847 | 85 | 19.8 | 0.0 | 80.2 |
| 1320 | 838 | 85 | 28.8 | 0.0 | 72.0 |

As in the preceding experiment, it was necessary to use sequential loading in the preparation of the catalyst used in this experiment. Methanol was used to add Na$_2$PtCl$_6$ and water was used to add the components of the molten salt.

Experiment 16. MCH—Pt—KCl—NaCl—LiCl/Al$_2$O$_3$

Catalyst: Pt, 2.0%
Supported Molten Salt: KCl/NaCl/LiCl (26/36/38 mole %)
Loading (q): 0.30
MCH/He Flow Rate: 60 cc/min
Reservoir Temperature: 167° F. (75° C.)
Reservoir Pressure (He + MCH): 85 psi
Drying: 15.5 hours, 302° F.
Reduction: H$_2$ gas, 100 psi, 18 hours, ramped 248–779° F.

| Elapsed Time (min) | Reactor Temp. (°F.) | Reactor Press. (psi) | Cracked | MCH | TOLUENE |
|---|---|---|---|---|---|
| 3 | 835 | 85 | 10.1 | 55.7 | 34.2 |
| 15 | 837 | 85 | 0.0 | 95.2 | 4.8 |
| 40 | 907 | 85 | 1.9 | 91.2 | 7.9 |
| 50 | 919 | 85 | 2.0 | 85.0 | 13.0 |
| 75 | 934 | 85 | 8.9 | 71.8 | 20.3 |
| 90 | 936 | 85 | 9.7 | 71.4 | 19.9 |
| 120 | 930 | 85 | 4.7 | 72.1 | 23.2 |
| 185 | 934 | 85 | 6.2 | 67.2 | 26.6 |
| 250 | 937 | 85 | 7.2 | 59.9 | 32.9 |
| 300 | 937 | 85 | 10.0 | 63.0 | 27.0 |
| 360 | 939 | 85 | 10.7 | 60.4 | 28.9 |
| 420 | 943 | 85 | 8.5 | 53.1 | 38.4 |
| 480 | 936 | 85 | 4.8 | 42.4 | 52.8 |
| 540 | 932 | 85 | 2.6 | 4.8 | 51.6 |
| 960 | 918 | 85 | 7.4 | 55.0 | 37.6 |
| 1080 | 930 | 85 | 6.0 | 53.5 | 40.5 |

In this experiment the catalyst and molten salt components were added to the support in the same way as in Experiment 15.

The results of Experiments 15 and 16 seem to be inconsistent with one another in that the catalyst containing the highest percentage of platinum displays lower activity after extended periods, but displays a higher initial activity.

In a separate experiment using the KCl/NaCl/LiCl eutectic, 2.0% Pt, and q=0.30, it was observed that hydrogen reduction of the catalyst for two hours at 1022° F. led to 70% initial conversion of MCH to toluene. This conversion remained nearly constant at 70%, with 30% cracking for 8160 min. When the reactor temperature was lowered to 896° F., the conversion dropped to 20%. Upon raising the temperature to 932° F., the conversion returned to 65% in 45 minutes. These observations are apparently due to diffusional limitations or freezing at the lower temperature. Even if freezing occurred, some catalysis would be expected by microcrystallites which extended above the surface of the frozen eutectic. At 959° F., the conversion to toluene was 68%, with 32% cracking. At even higher temperatures, the conversion to cracked product increased and toluene production decreased. Detailed data for this experiment are not reported because of a system leak discovered late in the experiment which made the flow measurements meaningless. The experiment is of value in that it indicates that the use of much higher temperatures in the reduction process can increase initial activities.

2. NICKEL CATALYSTS

Nickel catalysts were used on silica and alumina porous supports. In all cases the catalysts were generated by hydrogen reduction of $NiCl_2$ which was loaded with the components of the molten salt using methanol. The silica and alumina supports used were, in each experiments, the same as that used with platinum catalysts.

Experiment 17. MCH—Ni/SiO$_2$ ("conventional" heterogeneous catalyst)
Catalyst: Ni, 1.0%
Supported Molten Salt: -
Loading (q): 0.0
MCH/He Flow Rate: 30 cc/min
Reservoir Temperature: 217° F. (103° C.)
Reservoir Pressure (He + MCH): 100 psi
Drying: 2 hours, 302° F. (vacuum).
Reduction: H$_2$ gas, 1 atm, 14 hours, 752° F.

| Elapsed Time (min) | Reactor Temp. (°F.) | Reactor Press. (psi) | Cracked | MCH | TOLUENE |
|---|---|---|---|---|---|
| 1 | 824 | 85 | 30.3 | 24.9 | 44.8 |
| 11 | 824 | 85 | 45.3 | 40.7 | 12.1 |
| 22 | 824 | 85 | 49.5 | 43.2 | 6.4 |
| 80 | 824 | 85 | 52.7 | 47.3 | — |

The results reported are consistent with reports found in the literature for nickel used as a heterogeneous catalyst for the dehydrogenation of cycloalkanes. The initial activity observed here is somewhat higher than usually reported. The activity for converstion of MCH to toluene has decreased by a factor of seven in only 22 minutes under the conditions used.

Experiment 18. MCH—Ni—NaOH—KOH/SiO$_2$
Catalyst: Ni, 2.3%
Supported Molten Salt: NaOH/KOH (47/53 mole %)
Loading (q): 0.30
MCH/He Flow Rate: 30 cc/min
Reservoir Temperature: 217° F. (103° C.)
Reservoir Pressure (He + MCH): 100 psi
Drying: 2 hours, 572° F. (vacuum).
Reduction: H$_2$ gas, 1 atm, 14 hours, 752° F.

| Elapsed Time (min) | Reactor Temp. (°F.) | Reactor Press. (psi) | Cracked | MCH | TOLUENE |
|---|---|---|---|---|---|
| 1 | 885 | 85 | 24.6 | 62.6 | 12.5 |
| 56 | 909 | 85 | 34.5 | 47.5 | 10.9 |
| 132 | 901 | 85 | 33.5 | 51.7 | 14.5 |
| 249 | 912 | 85 | 30.6 | 51.6 | 17.7 |
| 304 | 907 | 85 | 30.1 | 49.4 | 20.4 |
| 356 | 903 | 85 | 30.2 | 49.1 | 20.7 |
| 423 | 903 | 85 | 28.9 | 47.0 | 24.2 |
| 601 | 916 | 85 | 35.4 | 36.7 | 28.0 |
| 676 | 912 | 85 | 36.0 | 34.0 | 29.7 |
| 790 | 912 | 85 | 31.5 | 34.0 | 34.2 |

The last recorded product analysis represents the highest conversion observed in this experiment but this isn't necessarily the upper limit which can be reached since the experiment was arbitrarily terminated at 790 minutes. The gradual increase in activity suggests that the reduction procedure used is not converting all of the $NiCl_2$ to Ni. As hydrogen is released during the dehydrogenation of MCH in the molten salt, it can lead to additional reduction of $NiCl_2$.

Experiment 19. MCH—Ni—NaOH—KOH/SiO$_2$
Catalyst: Ni, 3.8%
Supported Molten Salt: NaOH/KOH (47/53 mole %)
Loading (q): 0.50
MCH/He Flow Rate: 30 cc/min
Reservoir Temperature: 217° F. (103° C.)
Reservoir Pressure (He + MCH): 85 psi
Drying: 2 hours, 572° F. (vacuum)
Reduction: H$_2$ gas, 1 atm, 14 hours, 752° F.

| Elapsed Time (min) | Reactor Temp. (°F.) | Reactor Press. (psi) | Cracked | MCH | TOLUENE |
|---|---|---|---|---|---|
| 1 | 846 | 85 | 15.9 | 78.4 | 4.3 |
| 43 | 848 | 80 | 21.0 | 71.5 | 6.7 |
| 90 | 842 | 80 | 12.7 | 78.6 | 7.3 |
| 150 | 842 | 80 | 12.7 | 79.3 | 7.5 |
| 220 | 842 | 80 | 12.1 | 79.9 | 7.7 |
| 280 | 842 | 80 | 13.4 | 78.0 | 8.4 |
| 327 | 842 | 80 | 11.5 | 80.4 | 8.0 |
| 690 | 842 | 80 | 13.0 | 77.5 | 9.4 |
| 768 | 842 | 80 | 11.9 | 78.3 | 9.7 |

As was observed with platinum SMSC, when the liquid loading is elevated to 0.50, the initial activity of the catalyst is lower. This catalyst appears to be displaying the same tendency to increase its activity for MCH to toluene conversion with time, but at a very slow rate. It was noticed that the catalyst pellets, removed from the reactor after the reaction, were all black on the outside, but displayed the white color characteristic of the untreated pellets in the middle. This suggests that pore blockage has precluded thorough loading of the pellet and the catalytic activity observed was occurring at catalyst sites only near the outer surfaces of the pellet.

Experiment 20. MCH—Ni—NaOH—KOH/SiO$_2$
Catalyst: Ni, 2.3%
Supported Molten Salt: NaOH/KOH (47/53 mole %)
Loading (q): 0.30
MCH/He Flow Rate: 30 cc/min
Reservoir Temperature: 217° F. (103° C.)
Reservoir Pressure (He + MCH): 100 psi
Drying: 2 hours, 572° F. (vacuum).
Reduction: H$_2$ gas, 1 atm, 14 hours, 752° F.

| Elapsed Time (min) | Reactor Temp. (°F.) | Reactor Press. (psi) | Cracked | MCH | TOLUENE |
|---|---|---|---|---|---|
| 1 | 921 | 85 | 11.8 | 80.5 | 2.8 |
| 66 | 1018 | 85 | 15.5 | 74.6 | 8.6 |
| 140 | 1071 | 85 | 22.6 | 59.2 | 16.9 |
| 230 | 1135 | 85 | 23.8 | 44.5 | 32.3 |
| 320 | 1139 | 85 | 19.7 | 32.1 | 44.6 |
| 360 | 1144 | 85 | 19.3 | 32.1 | 44.0 |
| 380 | 1245 | 85 | 41.9 | 6.9 | 47.9 |
| 680 | 1152 | 85 | 25.7 | 20.4 | 50.1 |
| 794 | 1162 | 85 | 29.1 | 13.5 | 54.3 |

The results of this experiment suggest as did Experiment 18 that the hydrogen reduction of $NiCl_2$ in the eutectic is not very efficient. This experiment, which was arbitrarily stopped at 794 minutes, suggests that the use of nickel as a dehydrogenation catalyst in SMSC is much more effective than "conventional" nickel heterogeneous catalysts. With more extensive attempts to optimize the operational conditions for use of nickel in SMSC, it certainly shows promise of competing with "conventional" platinum heterogeneous catalysts, not only in conversion, but in rate of deactivation.

D. DECAHYDRONAPHTHALENE DEHYDROGENATION

Decalin has been catalytically dehydrogenated using both a "conventional" platinum heterogeneous catalyst and a SMSC platinum catalyst using the same catalyst loading, the same support, and the same operating conditions.

---

Experiment 21. Decalin - Pt/Al$_2$O$_3$ ("conventional" heterogeneous catalyst)

Catalyst: Pt, 1%
Supported Molten Salt: -
Loading (q): 0.00
Decalin/He Flow Rate: 30 cc/min
Reservoir Temperature: 218° F. (103° C.)
Reservoir Pressure (He + Decalin): 80 psi
Drying: 16 hours, 302° F. (vacuum).
Reduction: H$_2$ gas, 100 psi, 16 hours, 842° F.

| Elapsed Time (min) | Reactor Temp. (°F.) | Reactor Press. (psi) | DEC | NAPH | TET | OTHER |
|---|---|---|---|---|---|---|
| 60 | 880 | 80 | 68 | 32 | — | — |
| 150 | 869 | 80 | 50 | 40 | 10 | — |
| 180 | 869 | 80 | 2 | 73 | 25 | <1 |
| 330 | 880 | 80 | 7 | 93 | — | <1 |
| 480 | 873 | 80 | 14 | 52 | 33 | 1 |
| 1080 | 877 | 80 | 11 | 38 | 50 | 1 |
| 1170 | 880 | 80 | 28 | 28 | 38 | 62 |

In contrast to every experiment in which MCH was dehydrogenated, the catalyst did not display significant greying or blackening after the dehydrogenation of decalin. Apparently the cracking products of decalin and its dehydrogenation products do not lead to the formation of coke.

---

Experiment 22. Decalin - Pt/KCl—NaCl—LiCl/Al$_2$O$_3$

Catalyst: Pt, 1.0%
Supported Molten Salt: KCl/NaCl/LiCl (26/36/38 Mole %)
Loading (q): 0.30
Decalin/He Flow Rate: 70 cc/min
Reservoir Temperature: 212° F. (100° C.)
Reservoir Pressure (He + Decalin): 80 psi
Drying: 12 hours, 302° F.
Reduction: H$_2$ gas, 100 psi, 16 hours, 1022° F.

| Elapsed Time (min) | Reactor Temp. (°F.) | Reactor Press. (psi) | DEC | NAPH | TET | OTHER |
|---|---|---|---|---|---|---|
| 30 | 986 | 80 | — | 62 | — | 38 |
| 60 | 973 | 80 | — | 39 | — | 61 |
| 180 | 928 | 80 | — | 92 | 4 | 4 |
| 240 | 928 | 80 | — | 92 | 4 | 4 |
| 300 | 914 | 80 | — | 79 | 19 | 2 |
| 360 | 901 | 80 | — | 80 | 16 | 4 |

The support was first loaded with Na$_2$PtCl$_6$ in methanol, dried for 6 hours, and then the components of the molten salt were loaded using water. After vacuum drying at elevated temperature, the support pellets were placed into the tube reactor. As was observed in Experiment 21, no catalyst coking occurred for the platinum SMSC catalyst. The most significant observation that can be made in comparing Experiments 21 and 22 is that the SMSC catalyst appears to be more active in that decalin is not detected at any time with the SMSC catalyst. It is also of significance to note that the production of tetralin with the SMSC catalyst does not reach, in 360 minutes, the level produced by the "conventional" platinum catalyst in 180 minutes. These results suggest that the advantages offered for catalytic dehydrogenation by the SMSC method are greater for decalin than for MCH although advantages are obvious for both.

E. EXO-OCTAHYDRO-4,7-METHANO-1H-INDENE (JP-10) DEHYDROGENATION

JP-10 (exo-octahydro-4,7-methano-1H-indene) is of interest because of the possible occurrence of a coupled Retro-Diels-Alder reaction which would take place spontaneously after catalytic dehydrogenation occurs. JP-10 has been catalytically dehydrogenated using both a "conventional" platinum heterogeneous catalyst and a SMSC platinum catalyst using the same catalyst loading, the same support, and the same operating conditions.

---

Experiment 23. JP-10 - Pt/Al$_2$O$_3$ ("conventional" heterogeneous catalyst)

Catalyst: Pt, 1%
Supported Molten Salt: -
Loading (q): 0.00
Decalin/He Flow Rate: 60 cc/min
Reservoir Temperature: 203° F. (95° C.)
Reservoir Pressure (He + JP-10): 80 psi
Drying: 16 hours, 302° F. (vacuum).
Reduction: H$_2$ gas, 100 psi, 16 hours, 842° F.

| Elapsed Time (min) | Reactor Temp. (°F.) | Reactor Press. (psi) | JP-10 | DCP[a] | C$_8$H$_{10}$ | OTHER |
|---|---|---|---|---|---|---|
| 90 | 937 | 80 | 6 | — | — | 94 |
| 210 | 941 | 80 | 7 | — | — | 93 |
| 300 | 896 | 80 | 14 | 8 | — | 78 |
| 870 | 918 | 80 | 45 | 21 | 12 | 22 |
| 975* | 928 | 80 | 8 | 22 | 8 | 62 |
| 1110 | 928 | 80 | 24 | 18 | 5 | 53 |
| 1200 | 972 | 80 | 45 | 26 | 24 | 5 |

[a]dicyclopentadiene
*The reactor was restarted after a line was unplugged.

The data collected in this experiment display an unexplainable cyclic behavior rather than a monotonic variation anticipated as catalyst activity falls off. The materials listed as OTHER seem to be minimum and the C$_8$H$_{10}$ seems to be maximum when the lowest conversion of JP-10 occurs. Examination of the catalyst after the reaction revealed extensive coking. The formulas of some of the species included in OTHER were determined using mass spectroscopy. A proposed relationship between a number of these and C$_8$H$_{10}$ will be discussed after the presentation of the SMSC catalysis results in Experiment 24.

---

Experiment 24. JP-10 - Pt—NaOH—KOH/Al$_2$O$_3$

Catalyst: Pt, 1.0%
Supported Molten Salt: NaOH/KOH (47/53 mole %)
Loading (q): 0.30
JP-10/He Flow Rate: 60 cc/min
Reservoir Temperature: 203° F. (95° C.)
Reservoir Pressure (He + JP-10): 80 psi
Drying: 16 hours, 572° F. (vacuum).
Reduction: H$_2$ gas, 100 psi, 15.5 hours, 752° F.

| Elapsed Time (min) | Reactor Temp. (°F.) | Reactor Press. (psi) | JP-10 | DCP[a] | C$_8$H$_{10}$ | OTHER |
|---|---|---|---|---|---|---|
| 90 | 905 | 80 | 22 | — | 22 | 56 |
| 180 | 891 | 80 | 57 | — | 14 | 29 |
| 315 | 900 | 80 | 9 | 66 | 6 | 19 |
| 1050 | 889 | 80 | 17 | 12 | 57 | 14 |
| 1080 | 907 | 80 | 19 | 60 | 12 | 9 |
| 1125 | 909 | 80 | 25 | 10 | 25 | 40 |
| 1245 | 903 | 80 | 8 | 12 | 58 | 22 |
| 1335 | 896 | 80 | 13 | 13 | 47 | 27 |
| 1410 | 905 | 80 | 11 | 13 | 37 | 39 |

-continued

Experiment 24. JP-10 - Pt—NaOH—KOH/Al$_2$O$_3$

Catalyst: Pt, 1.0%
Supported Molten Salt: NaOH/KOH (47/53 mole %)
Loading (q): 0.30
JP-10/He Flow Rate: 60 cc/min
Reservoir Temperature: 203° F. (95° C.)
Reservoir Pressure (He + JP-10): 80 psi
Drying: 16 hours, 572° F. (vacuum).
Reduction: H$_2$ gas, 100 psi, 15.5 hours, 752° F.

of C$_7$H$_8$ is especially of importance since this species is known to form very rapidly and spontaneously at 400° F. and lower by the Diels-Alder reaction of acetylene and cyclopentadiene. The method of analysis used in our experiments thus far would not permit direct detection of acetylene but its production can be inferred by detection of its Diels-Alder addition products and by the detection of C$_8$H$_{10}$, the second product formed in the Retro-Diels-Alder reaction which produces acetylene.

SCHEME 1

| Time (min) | Temp. (°F.) | Press. (psi) | JP-10 | DCP$^a$ | C$_8$H$_{10}$ | OTHER |
|---|---|---|---|---|---|---|
| 1890 | 909 | 80 | 5 | 13 | 72 | 10 |

$^a$dicyclopentadiene

The data from this experiment also display the cyclic behavior mentioned in the discussion of Experiment 23. A significant portion of the species marked OTHER contains low molecular weight volatile species which apparently arise by way of some cracking mechanism. These products reach maximum productivity when JP-10 conversion is lowest and vice versa.

The most striking thing about the data from this experiment is the production of C$_8$H$_{10}$ (as determined by gas chromatography -mass spectral analysis) which increases as the reaction proceeds. The production of this species represents a major pathway in the observed reaction. Another interesting species found in the OTHER grouping is C$_7$H$_8$. One possible reaction sequence which ties all of these products together is shown in Scheme 1. This scheme is consistent with the experimental design currently used which involves sampling the product gas stream by gas chromatography after it has passed through ⅛ inch stainless steel tubing and has cooled several hundred degrees. Diels-Alder reactions, which would be spontaneous at the lower temperatures downstream from the reactor, could give rise to many of the observed products. The observation

F. CONCLUSIONS

The use of metal microcrystallites heterogeneously dispersed in supported molten salts for catalytic processes represents a new technology.

The method of SMSC applied to catalytic dehydrogenation of cycloalkanes appears to offer some potential for overcoming problems previously encountered in this process. (Nixon, AC., *A Study on Endothermic and High Energy Fuels for Airbreathing Engines*, 1986).

In dehydrogenation of methylcyclohexane under the same operating conditions, platinum SMSC catalysts display comparable activity but much better stability to deactivation than "conventional" platinum heterogeneous catalysts. Nickel SMSC catalysts display both higher activity and increased catalyst lifetime when compared to "conventional" nickel heterogeneous catalysts. In dehydrogenation of decalin, a platinum SMSC catalyst displayed higher activity than a "conventional" platinum heterogeneous catalyst.

In dehydrogenating JP-10, a platinum SMSC catalyst displayed higher activity and decreased rate of deactivation relative to a "conventional" heterogeneous platinum catalyst. In addition, this catalyst displayed an apparent selectivity for sites of dehydrogenation which made it possible to produce acetylene in a subsequent Retro-Diels-Alder reaction.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

We claim:

1. A catalytically active composition, comprising:
   a porous substrate having a large internal surface area;
   a molten salt disposed to coat said surface area with a thin film; and
   microcrystallites of a catalytically active metal heterogeneously dispersed in said molten salt.

2. The composition of claim 1 wherein said microcrystallites of catalytically active metal are generated by a precursor dispersed in said molten salt.

3. The composition of claim 1 wherein said substrate is silica.

4. The composition of claim 1 wherein said substrate is alumina.

5. The composition of claim 1 wherein said molten salt is a eutectic including alkali metal hydroxides.

6. The composition of claim 1 wherein said molten salt is a eutectic including alkali metal chlorides.

7. The composition of claim 1 wherein said catalytically active metal is platinum.

8. The composition of claim 1 wherein said catalytically active metal is nickel.

9. The composition of claim 2 wherein said precursor is an oxidized form of said catalytically active metal subjected to reducing conditions after being dispersed in said molten salt.

10. The composition of claim 5 wherein said eutectic includes 47 mole percent NaOH and 53 mole percent KOH.

11. The composition of claim 6 wherein said eutectic includes 41.5 mole percent KCl and 58.5 mole percent LiCl.

12. The composition of claim 6 wherein said eutectic includes 26 mole percent KCl, 36 mole percent NaCl, and 38 mole percent LiCl.

* * * * *